(12) United States Patent
Buecker (10) Patent No.: US 12,275,196 B2
(45) Date of Patent: Apr. 15, 2025

(54) METHOD FOR PRODUCING A SPIDER FROM CONTINUOUS FIBER PLASTIC COMPOSITE

(71) Applicant: Institut für Verbundwerkstoffe GmbH, Kaiserslautern (DE)

(72) Inventor: Marcel Buecker, Kaiserslautern (DE)

(73) Assignee: Institut für Verbundwerkstoffe GmbH, Kaiserslautern (DE)

( * ) Notice: Subject to any disclaimer, the term of this patent is extended or adjusted under 35 U.S.C. 154(b) by 799 days.

(21) Appl. No.: 17/049,673

(22) PCT Filed: Jun. 7, 2019

(86) PCT No.: PCT/EP2019/065043
§ 371 (c)(1),
(2) Date: Oct. 22, 2020

(87) PCT Pub. No.: WO2019/234250
PCT Pub. Date: Dec. 12, 2019

(65) Prior Publication Data
US 2021/0245450 A1    Aug. 12, 2021

(30) Foreign Application Priority Data
Jun. 9, 2018   (DE) .................... 10 2018 113 797.4

(51) Int. Cl.
*B29C 70/24*   (2006.01)
*B29C 70/38*   (2006.01)
(Continued)

(52) U.S. Cl.
CPC .............. *B29C 70/24* (2013.01); *B29C 70/38* (2013.01); *B60B 3/10* (2013.01); *B60B 5/02* (2013.01)

(58) Field of Classification Search
CPC .. B60B 3/10; B60B 5/02; B29C 70/24; B29C 70/38
See application file for complete search history.

(56) References Cited

U.S. PATENT DOCUMENTS 3,917,352 A * 11/1975 Gageby .................... B29C 70/24
301/64.702
4,483,214 A * 11/1984 Mayer .................... B29C 70/347
156/169

(Continued)

FOREIGN PATENT DOCUMENTS

| DE | 102016210756 A1 * | 12/2016 | ......... B29D 99/0032 |
| JP | 61242833 A * | 10/1986 | ......... B29D 99/0032 |
| JP | 61242834 A * | 10/1986 | ......... B29D 99/0032 |

OTHER PUBLICATIONS

Partial translation of JP 61242834 A (Year: 1986).*
Partial translation of JP 61242833 A (Year: 1986).*
Machine Translation of DE 102016210756 A1 (Year: 2016).*

*Primary Examiner* — S. Joseph Morano
*Assistant Examiner* — Emily G. Castonguay
(74) *Attorney, Agent, or Firm* — Tatonetti IP (57) ABSTRACT

Production method for a spoke star (5) with one or more continuous fibre bundles (111),
during which a production device (100) is used for winding a fibre coil (3) and for deforming the fibre coil (3) into a spoke star (5),
wherein the production device (100) comprises a plurality of deflection devices (2) at the rim side and a plurality of deflection devices (4) at the hub side,
wherein the deflection devices (2) at the rim side and the deflection devices (4) at the hub side are arranged around an interior of the arrangement (10) of the deflection devices (2, 4),
wherein in a first step a continuous fibre bundle (111) is wound around at least a portion of the rim-side deflection devices (2) as a fibre coil (3), (Continued)

and in a second step, after this winding, at least a portion of the hub-side deflection devices (4) are shifted in the direction of the interior of the arrangement (10), the fibre coil (5) being deformed into a star, so that between the hub-side deflection devices (4) and the rim-side deflection devices (2) spokes (12) are formed from portions of the fibre coil (3), which form at least a portion of a closed spoke star (5). Further, the invention relates to a production device (100), a spoke star (5) and a spoked wheel (11).

13 Claims, 6 Drawing Sheets

(51) Int. Cl.
  *B60B 3/10* (2006.01)
  *B60B 5/02* (2006.01)

(56) References Cited

U.S. PATENT DOCUMENTS

| | | | | |
|---|---|---|---|---|
| 5,578,154 | A | * 11/1996 | Britten | B29C 53/564 |
| | | | | 156/154 |
| 2016/0236423 | A1 | * 8/2016 | Shimoda | B29C 53/564 |

* cited by examiner

METHOD FOR PRODUCING A SPIDER FROM CONTINUOUS FIBER PLASTIC COMPOSITE

CROSS-REFERENCES TO RELATED APPLICATIONS

This Non-Provisional Patent Application claims the benefit of and priority to PCT Application Serial No. PCT/EP2019/065403, filed Jun. 7, 2019, entitled "Method for Producing a Spoke Star from Continuous Fibre/Plastic Composite," which claims the benefit of and priority to German Patent Application Serial No. DE102018113797.4, filed Jun. 9, 2018, entitled "Method for Producing a Spoke Star from Continuous Fibre/Plastic Composite," the entire contents of both applications are hereby incorporated herein by reference.

BACKGROUND

This invention relates to a production method for a spoke star with one or more continuous fibre bundles. Further, the invention relates to a production device for producing the spoke star, the spoke star itself, and a spoked wheel.

A spoke star is an at least approximately star-shaped structure whose radii are formed by spokes.

It is known to produce spoked wheels from fibre/plastic composite material. In the prior art, motor vehicle rims of fibre/plastic composite material are known, resembling cast iron rims. These are given their shape by fibre mats, which are mounted on a form template. The impregnated fibre mats are cured in order to produce the spoked wheel.

The drawback to this prior art is that preshaped form elements are required in order to give the rim its shape. Such forms are relatively costly to produce, and are accordingly expensive. Furthermore, they only allow for the production of a particular type of spoked wheel in a particular size. Moreover, the fibre utilization in the known solutions is not optimal.

EP 0 089 809 A1 discloses a fibre-reinforced element with approximately the shape of a clover leaf, which can be used as a spoke element for a flywheel. Starting from a hub section, three fibre bundles are placed around three annular shaping elements which dictate the spoke shape for a spoke section having two spokes each, the fibre bundles running from one spoke section to the next spoke section.

Here as well the drawback is that the shaping elements are only suitable for a particular type of spoke element. This makes this method inflexible in regard to the production of different types of spoke elements.

SUMMARY

The problem which the invention proposes to solve is to enable a greater flexibility in the production of different types of spoke stars and/or wheels or rims.

The subject matter of the invention is a production method for a spoke star during which a production device is used, having a plurality of deflection devices at the rim side and a plurality of deflection devices at the hub side. The production device is used for winding a fibre coil and for deforming the fibre coil into a spoke star. The deflection devices at the rim side and the deflection devices at the hub side are arranged around an interior of the arrangement of the deflection devices. In a first step, a continuous fibre bundle is wound around at least a portion of the rim-side deflection devices as a fibre coil. In a second step, after this winding at least a portion of the hub-side deflection devices is shifted in the direction of the interior of the arrangement, the fibre coil being deformed into a star. Between the hub-side deflection devices and the rim-side deflection devices, spokes are formed from portions of the fibre coil, which form at least part of a closed spoke star.

A spoke star according to the invention can be produced by deformation of a fibre coil and thus it may be viewed as being a deformed ring. Preferably, the spokes run at least approximately radially. The connections between the ends of the spokes on the inner diameter and on the outer diameter preferably have different lengths. Alternatively, spokes may also have a parallel configuration. The spokes are preferably straight at least to a large degree.

A fibre bundle is preferably a bundle of multiple continuous fibres, such as a roving or multiple rovings, having in particular a unidirectional fibre profile, or a band, a towpreg, an elongated prepreg, or an elongated scrim or web. A continuous fibre, as used customarily in speech in composite fibre technology, is not actually endless in length. A continuous fibre in this patent application is defined as a fibre with the special attribute of being longer than a spoke. However, it is also conceivable to use fibres which are shorter than a spoke and combine them into a longer fibre bundle.

A spoke star may be provided, for example, as part of a spoked wheel. It may serve for the connecting of a hub to a wheel rim. Preferably the spoke star has a whole number of spokes. Preferably the spoke star is rotationally symmetrical in configuration, wherein mutually rotationally symmetrical sections in particular comprise two spokes each time.

A midpoint of the arrangement of deflection devices used may be, e.g., a winding centre. However, the winding centre may also be another point inside this arrangement.

Reserve deflection devices may be provided for spoke star types, requiring a larger number of deflection points and going unused during the production of a spoke star with a smaller number of deflection points. For example, spoke stars may be produced with groups of rim-side and hub-side deflection devices, these groups being able to have different numbers of deflection devices. In the most simple instance, a rim-side alternates with a hub-side deflection device. The groups then have one deflection device each time. If two deflection devices are arranged in a group, the spoke star may run for a longer section along the hub side or along the rim side. Moreover, two deflection devices in at least one of the groups of the rim-side and hub-side deflection devices enable producing a different slanting of the spokes on account of their positions in the circumferential direction. With more than two deflection devices in a group, it is possible to adapt the trend of a circumferential section of the spoke star on the hub side or the rim side, for example, to approximate a circular trend. It is also conceivable to use deflection devices in the trend of a spoke between the rim side and the hub side, in order to provide it with a bend.

The rim-side deflection devices are preferably displaced at the same time as the hub-side deflection devices, especially in such a way that tension is maintained in the fibre coil. The hub-side deflection devices for this purpose may be displaced to a larger extent in the direction of the interior of the arrangement of the deflection devices.

The hub-side deflection devices prior to the displacement are preferably arranged at a greater distance from the interior of the arrangement, especially from the winding centre, than the rim-side deflection devices. After the displacement, the rim-side deflection devices are arranged at a greater distance from the interior of the arrangement, especially from the winding centre, than the hub-side deflection devices. Relevant points of the deflection devices for the distance are defined as being those at which the fibre coil leaves the deflection devices.

Preferably the fibre coil has at least approximately the same thickness overall in the radial direction. In this way, a uniform thickness of the spokes in the resulting spoke star can be achieved. Regions of the spoke star lying between the spokes can have the same thickness.

Preferably the fibre coil is wound in overlapping layers. The positions of the layers in the fibre coil are preferably maintained during the deformation. For this purpose, the fibre coil may be held under tension or at least in shape until the end of the deformation.

The deflection devices may be designed as sleeves, having a continuous borehole in their interior. In this case, the sleeves may remain on or in the spoke star or be removed once more. A sleeve may be placed for the deformation of a fibre coil into a spoke star on a deflection device carrier, which can be designed for example as an axle on a mover of a displacement device. After the deformation has occurred, the spoke star including the sleeves can be pulled off from the deflection device carrier. The continuous boreholes of the sleeves can be used for fastening the spoke star to a hub or a wheel rim. It is conceivable to embed the sleeves into a hub or a wheel rim.

One benefit of this production method is that the spoke star can be produced by winding and deforming of the fibre coil. During the deforming of the fibre coil, the fibres are advantageously neither compressed nor stretched, but solely bent. No fibres are ejected from the winding plane during the deforming, even though the wound material is given sections of different length on either side of the neutral fibre during a bending at the bending point. Thanks to the different bending direction at the rim-side deflection devices and the hub-side deflection devices, compression and stretching cancel each other out on both sides of the neutral fibre. The layers simply slide against each other, which poses no problem, at least in the case of wet wound material.

One benefit of this method is that, thanks to the displaceability of the deflection devices, there is great freedom in regard to the shapes of the spoke star that can be produced. It is possible to make different sized spoke stars and/or spoke stars with different number of spokes by using the same production device. For this, the size of the fibre coil, the number of the deflection devices, the positions at the start and end of the deforming, are adapted. The control of the movement sequence of the rim-side deflection devices and the hub-side deflection devices can be adapted to the aforementioned circumstances.

Preferably at least one portion of the rim-side deflection devices is displaceable in its radial position in relation to the interior of the arrangement, especially from a winding centre, to a start position for the deformation process of the fibre coil, in order to adjust the size of the spoke star to be produced.

Preferably the rim-side deflection devices are displaceable at least approximately in the winding direction of the fibre coil or at least approximately in the circumferential direction about the interior of the arrangement, especially about the winding centre, especially in such a way that at least one spoke of a spoke star is oriented at least approximately radially.

With such a displacement, the orientation of the spokes in relation to a radial direction of the spoke star can be achieved. Thus, a modification of the design of the spoke star can be accomplished. For example, spokes can run radially or adjacent spokes can run in parallel or alternately have the same slanting in opposite directions or a differing profile between hub and wheel rim.

Preferably a rim coil of a continuous fibre bundle is wound around an outer circumference of the spoke star, which is configured in particular as a wheel rim or a part of a wheel rim.

In this way, a rim can be produced. Preferably the same fibre bundle from which the spoke star was previously produced can be wound around the spoke star in order to produce the wheel rim or a portion thereof.

Preferably a deflection device is designed to be rotatable about an axis of rotation and is provided with a helical recess on its outer circumference, into which the fibre coil is laid. The axis of rotation runs in the interior of the helical recess and the deflection device is rotated in order to move the fibre coil in the direction of the axis of rotation on the outer circumference of the deflection device. It is also conceivable to use a double helix.

With the aid of such a deflection device, it is possible to alter the position of a spoke in the axial direction of the spoked wheel.

A method according to one of the preceding claims, characterized in that a rim-side outer section of the spoke star and/or the rim coil is placed against a shaping device, preferably against the inside of the spoke star and/or the rim coil.

In particular, with such a shaping device sections of the spoke star and/or the spoked wheel lying against it can be given a shape dictated by the shaping device, preferably a uniform rounding of the outer contour of the spoke star and/or the rim coil, preferably with the same radius.

Different shaping devices may be used for outer sections of the spoke star and sections of a rim coil. Different shaping devices may be used for different types of spoke stars.

A shaping device may be movably arranged on its own displacement device.

The finished spoke star with or without rim coil is preferably wound wet, especially from preimpregnated material. However, it is also possible to impregnate the spoke star after the winding. In the impregnated condition, the spoke star can be cured or it can be cured by straightforward chemical reaction. After this, the spoke star and especially the rim coil can be circularly turned or ground.

In a further aspect of the invention, a production device is proposed for producing a spoke star with continuous fibres. The production device comprises a plurality of rim-side deflection devices and a plurality of hub-side deflection devices, each of which is set up to receive a fibre coil and which at the start of a deformation of a fibre coil are arranged around an interior of an arrangement of the deflection devices. Further, the production device comprises a plurality of displacement devices for the hub-side deflection devices, by which the hub-side deflection devices are displaceable from a position at the start of the deformation in the direction of the interior of the arrangement.

An arrangement of deflection devices about an interior of the arrangement means that the deflection devices at the start of the deformation are located not in the interior of the arrangement, but rather outside of an interior region, for example, on its margin or in the vicinity thereof.

By means of such a production device, variously shaped spoke stars made from fibre coils can be produced.

A displacement device comprises a displacement axis along which a deflection device can move, especially in a linear manner. Preferably, the production device comprises multiple displacement devices for the rim-side deflection devices. Thanks to these displacement devices it is possible to displace the hub-side and the rim-side deflection devices at the same time. By suitable relations for the movement of the two types of deflection devices, one can hold the fibre coil taut during the deforming. This has the benefit that the individual layers of continuous fibre bundles maintain their arrangement and do not cross over each other during the deforming. In this way, a good quality of the spoke star can be achieved.

An actuating device may be provided with which the movements of the displacement devices for the rim-side and the hub-side deflection devices can be coordinated in order to hold the fibre coil taut during the deforming. Preferably the actuating device comprises an electronic machine controller.

Preferably the production device comprises a winding device with which a continuous fibre material can be wound around a winding centre in order to create the fibre coil. For this, the arrangement of the rim-side deflection devices can be placed in rotation. In particular, a continuous fibre bundle can be wound onto the outer sides of the deflection devices in this way. In one alternative, the winding device or a portion thereof may also be moved around the rim-side deflection devices. Alternatively, it is possible to wind the fibre coil by hand.

Preferably at least one displacement device is pivotable in a surface in which the deflection devices are arranged. In particular, the displacement device is pivotable about a point in the interior of the arrangement, preferably about the winding centre.

Such a pivoting makes it possible to alter the position of the deflection devices in the circumferential direction around the arrangement of the deflection devices or the winding centre. In this way, the distances between adjacent deflection devices can be changed. Alternatively or additionally, it is also conceivable to design a displacement device to be laterally movable in relation to its displacement axis.

Preferably groups of rim-side and hub-side deflection devices follow in succession in the winding direction about the interior of the arrangement. A group comprises preferably at least one deflection device, preferably precisely two deflection devices, and/or more than two deflection devices. In particular, one hub-side deflection device follows two rim-side deflection devices.

The latter option has the benefit that the distance of the radially outer ends of the resulting spokes in the circumferential direction around the arrangement is greater than the distance of the radially inner ends of the resulting spokes in the radial direction. This makes possible a longer section of the spoke star running parallel to a rim coil. In one embodiment, the connecting of the radially inner ends of the resulting spokes in the circumferential direction is realized only by a deflection at a hub-side deflection device. The connecting of the radially outer ends of the resulting spokes in the radial direction may be done through two deflection devices. It is conceivable that the deflection devices of one group are jointly displaceable by one displacement device. It is conceivable in this case that the mutual spacing of deflection devices of a group can be changed at the same time as the displacement.

The deflection devices can be mounted on a common carrier plate. Alternatively or additionally, one or more displacement devices may be fastened to the carrier plate.

Preferably one deflection device has a helical recess and is designed to be rotatable about a theoretical axis of rotation, while a fibre coil encircles the axis of rotation in the coiled state.

A deflection device with a helical recess is preferably formed at least approximately as a roller. Such a deflection device may have a central section with a smaller diameter than projecting side pieces at the axial ends.

A deflection device with a helical recess has the benefit that, by turning the deflection device about the axis of rotation, the position of the fibre coil on the deflection device can be adjusted in the direction of the axis of rotation. In this way, it is possible to move one point of the spoke star running around a deflection device out from a winding plane. Thus, a spoke can be slanted, moving out from a winding plane. A spoke star can advantageously better transmit the axial forces acting on it by spokes which are slanted in the axial direction. For example, consecutive spokes or groups of spokes may have oppositely directed slanting. The adjusting of the position of the fibre coil in the direction of the axis of rotation is preferably done after the winding onto the deflection device.

The production device is preferably designed, after finishing the production of a spoke star, to wind a rim coil in the production device onto the sections of the spoke star running between the rim-side deflection devices. The rim coil may be a wheel rim or a portion thereof. The spoke star does not need to be removed from the production device to create the rim coil.

The production device may comprise one or more shaping devices, having in particular the same number as the number of rim-side deflection devices. The shaping devices are arranged between rim-side deflection devices. A shaping device lies against a section of the spoke star or against a section of the rim coil and transfers its shape to it. In this way, for example, a rounding can be achieved on the outer circumference of the spoke star or the rim coil. It is possible, by using the shaping devices, to create a round wheel. Spoke star shaping devices can be arranged between adjacent rim-side deflection devices between which a section of the spoke star extends. Rim coil shaping devices can run between these sections of the spoke star. Shaping devices can be designed to be inserted into the production device and removed from it or otherwise made inactive. Thus, the shaping devices can then be used advantageously when they are so required, but otherwise do not disrupt the production process of the spoke star.

In a further aspect of the invention, a spoke star made from a fibre/plastic composite is proposed, which is configured as a closed ring in star shape. The spoke star comprises spokes between a hub-side inner circumference of the spoke star and a rim-side outer circumference of the spoke star. In the spoke star, a single fibre bundle runs repeatedly between the inner circumference and the outer circumference along spokes of the spoke star.

One benefit of such a configuration with only a single fibre bundle is that such a spoke star can be wound from a single fibre bundle without complication by using a simple winding device and then be deformed. Moreover, a start of the fibre bundle may be positioned at any desired point in the fibre coil. This also facilitates the production of such a spoke star.

A fibre bundle may for example be a roving or multiple rovings or a band or an elongated piece of a scrim or web. The fibre bundle preferably comprises so-called continuous fibres.

Preferably the spoke star has shaping elements specially introduced for this purpose in a section of significant length. However, it is possible for deflection elements from the production process of the spoke star to remain in the spoke star. In particular, the shape of the spoke star may be dictated by cured fibre/plastic composite, and preferably the shape of the spoke star is established exclusively by cured fibre/plastic material.

Preferably the spoke star has a whole number of spokes. Preferably the spoke star has a rotationally symmetrical configuration, where mutually rotationally symmetrical sections each comprise two spokes.

Preferably the spokes run at least approximately radially. The connections between the ends of the spokes at the inner circumference and at the outer circumference preferably have different lengths. Alternatively, spokes may also have a parallel configuration.

Preferably the fibre bundle runs through all the spokes. The fibre bundle runs preferably for more than one turn along the spoke star and in particular takes the same path through the spoke star several times.

In this way, the spoke star may be wound by a single winding process from a single fibre bundle.

A spoke star for example may be used as an elastic element of a coupling. Such a coupling may be in particular a compensating coupling. The spoke star may then be fastened for example at its hub side on a first coupling connection element and at its rim side on a second coupling connection element. Thanks to its elasticity, it can compensate for an angular offset and/or a parallel offset of the two coupling connection elements.

In a further aspect of the invention, a spoked wheel is proposed, made of a fibre/plastic composite having a hub, a rim and several spokes between the hub and the rim. The spoked wheel comprises a spoke star according to the above described embodiments, wherein at least a portion of the wheel rim is wound around the spoke star made from a fibre bundle.

Preferably the fibre bundle which forms at least part of the wheel rim is the same fibre bundle from which the spoke star is also produced.

A spoke star may be fastened on a wheel rim and on a hub, so that a spoked wheel is formed from it. A spoked wheel may be formed in particular as a vibration coupling, a gear wheel, a belt wheel, a roller bottom, a grinding disc, an impeller wheel, or as some other revolving component or a component with a revolving loading. For example, a coupling can be formed from two interconnected spoke stars. The connection between the spoke stars is preferably arranged in a region far from the centre of rotation of the coupling. A spoked wheel may also be designed as a vehicle rim, especially for a motor vehicle. It is also possible to use a spoke star for a spoked wheel for static purposes. In particular, such a spoked wheel can be oriented at least approximately horizontally or at an angle of less than 80°. A spoked wheel can be supported in the middle in particular and carry loads on its outer region. The reverse case, in which the spoked wheel is supported on the outside and carries a load in the middle, is likewise conceivable.

According to one embodiment, the spoke star (5) is fastened to the hub (13) by a hub-side deflection device (4) or the hub (13) is designed to receive a hub-side deflection device (4), wherein the hub-side deflection device (4) is preferably designed as a sleeve with a continuous borehole.

A hub-side deflection device (4) may improve the strength of the connection between the spoke star and the hub. If the hub-side deflection device is designed as a sleeve, the spoked wheel can be screwed tight through this sleeve against a wheel carrier.

Preferably at least one portion of the spokes is narrow in the radial direction as compared to its depth in the axial direction. In this way, the spoked wheel can transmit axial forces from the wheel rim to the hub especially well by means of these spokes. Thanks to the relatively smaller extension in the radial direction, the spokes have a lower weight. In this way, the spoked wheel as a lightweight structure can meet the requirements of the axial force transmission and the low weight.

The spokes may run between the hub and the wheel rim and also in particular in the axial direction of the spoked wheel. In this way, axial forces can be better absorbed.

Preferably the spoked wheel comprises an even number of spokes.

Preferably the spoke star of a spoked wheel is arranged at an axial end of the wheel rim and preferably also at an axial end of the hub. Thanks to this arrangement, space is present in the interior of the spoked wheel in order to provide there, e.g., a bearing of the spoked wheel.

BRIEF DESCRIPTION OF THE DRAWINGS

The figures describe exemplary embodiments of the invention. There are shown in.

DETAILED DESCRIPTION

Figure 1:
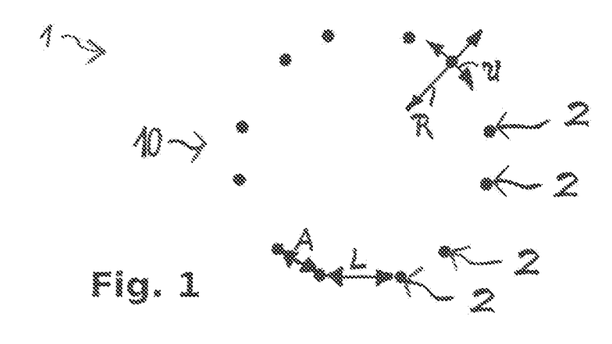
FIG. 1 schematically, an arrangement of rim-side deflection elements of a production device for producing a spoke star.

FIG. 1 shows schematically an arrangement of rim-side deflection devices 2 in a surface 1 of a production device 100 not shown in detail. The surface is preferably flat in configuration. The rim-side deflection devices 2 are arranged movably in the direction of the interior of the arrangement, preferably also away from the interior of the arrangement. In particular, the rim-side deflection devices 2 are movable in the radial direction R. Preferably, the rim-side deflection devices 2 are additionally movable in the circumferential direction U. In the representation of FIG. 1, the rim-side deflection devices 2 preferably have, in pairs, a smaller spacing A from each other in the circumferential direction than the width of a gap L between the pairs. It is also possible to provide, instead of pairs of two rim-side deflection devices 2, only one, or groups of more than two rim-side deflection devices 2. Preferably the rim-side deflection devices 2 are arranged on a theoretical circle.

Figure 2:
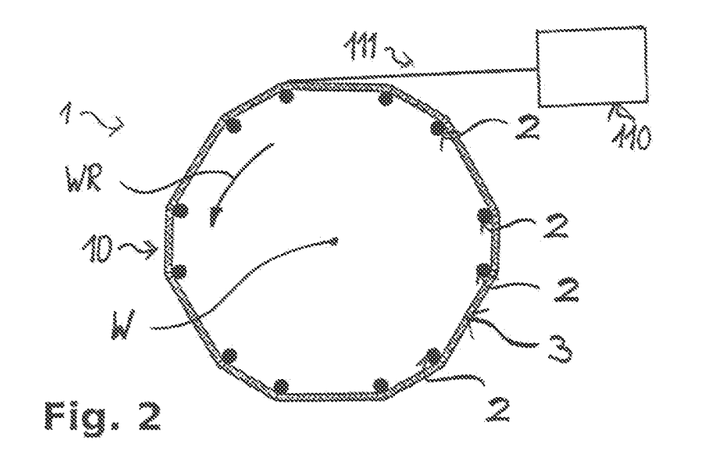
FIG. 2 schematically, the arrangement of FIG. 1, but with a fibre coil which is wound around the rim-side deflection elements.

FIG. 2 shows schematically the deflection devices 2 of FIG. 1, but additionally with a fibre coil 3, which is wound around the deflection devices 2. The fibre coil 3 is approximately circular in shape, but the sections between the rim-side deflection devices 2 are straight in configuration. It is wound around a winding centre W of a continuous fibre bundle 111. The continuous fibre bundle 111 is provided by a winding device 110. As shown here, the rim-side deflection devices 2 can be placed in rotation in a winding direction WR. It is also possible for the winding device 110 to rotate around the rim-side deflection devices 2.

Figure 3:
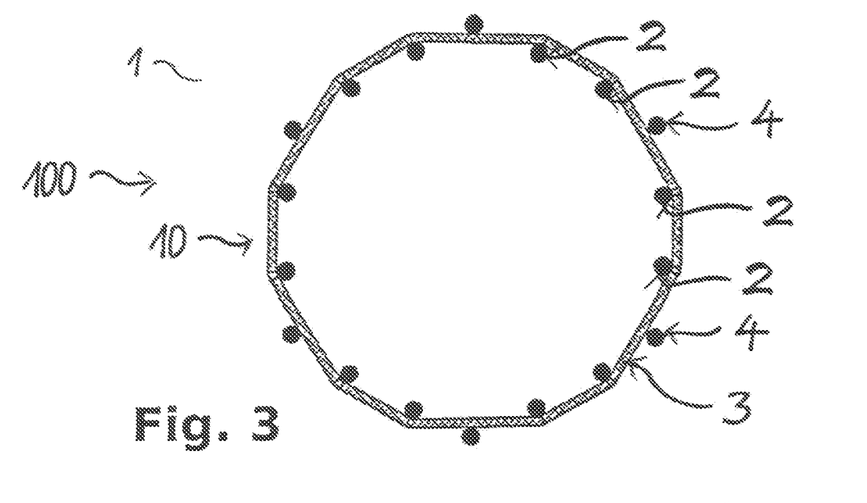
FIG. 3 schematically, the arrangement of FIG. 2, but with additional hub-side deflection elements.

FIG. 3 shows schematically the deflection devices 2 and the fibre coil 3 of FIG. 2, but hub-side deflection devices 4 are drawn in addition in the surface 1. These hub-side deflection devices 4 are preferably not present in the surface 1 in the state of the production device represented in FIG. 2, so as to facilitate the winding process. They may be introduced for example by hand into the surface 1 or be positioned there automatically in order to produce the state shown in FIG. 3. The hub-side deflection devices 4 are preferably arranged in the middle of the gaps between the pairs of rim-side deflection devices 2, although this also need not be done. The hub-side deflection devices 4 are arranged movably in the direction of the interior of the arrangement of rim-side deflection devices 2, preferably also being movable away from the interior of the arrangement. Preferably, the rim-side deflection devices 2 are additionally movable in the circumferential direction U. Preferably the hub-side deflection devices 2 are arranged on a theoretical circle.

Figure 4:
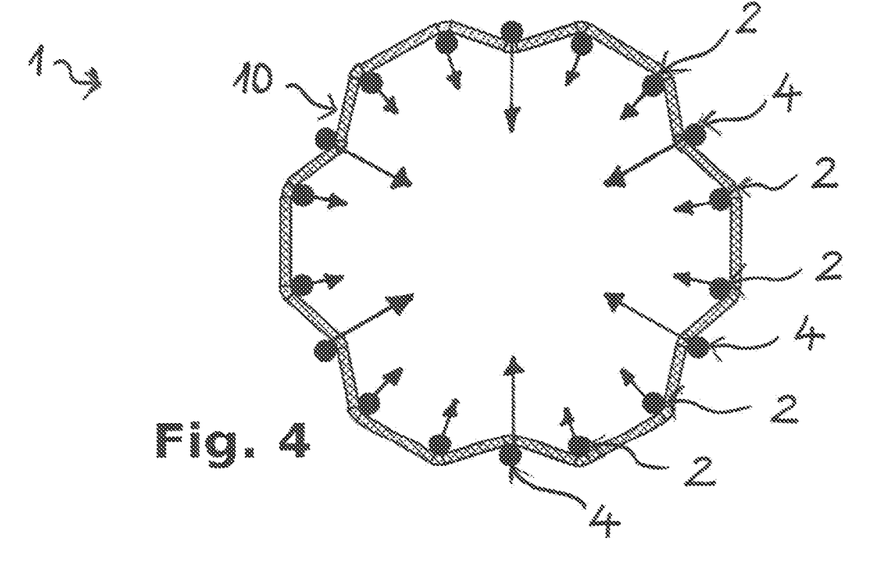
FIG. 4 schematically, the arrangement of FIG. 3, but wherein the hub-side and the rim-side deflection elements are displaced to produce the spoke star.

FIG. 4 shows schematically the rim-side and hub-side deflection devices 2, 4 as well as the fibre coil 3 of FIG. 3, showing the start of the shaping of a spoke star. For this purpose, the hub-side deflection devices 4 are displaced in the direction of the interior of the arrangement 10, as shown by long arrows. Because the fibre coil 3 does not yield in its length, the rim-side deflection devices 2 must also be displaced in the direction of the interior of the arrangement 10. Since the path of this displacement is shorter, it is shown by short arrows.

Figure 5:
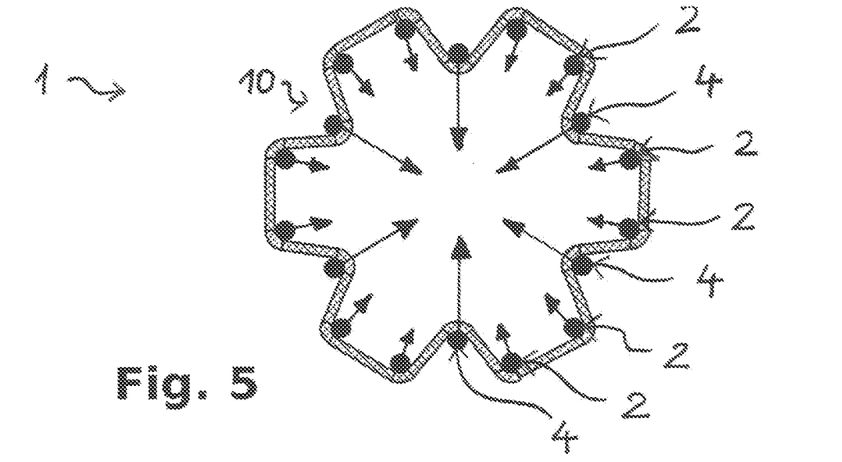
FIG. 5 schematically, the arrangement of FIG. 4, but wherein the displacement of the hub-side and rim-side deflection elements has proceeded further.

FIG. 5 shows schematically the rim-side and hub-side deflection devices 2, 4 as well as the fibre coil 3 of FIG. 4, wherein the shaping of a spoke star has proceeded further. In FIG. 3 it becomes clear that during the shaping of the spoke star the hub-side deflection devices 4 at the beginning are further away from the interior of the arrangement 10 than the rim-side deflection devices 2. In FIG. 5, however, this has been reversed.

Figure 6:
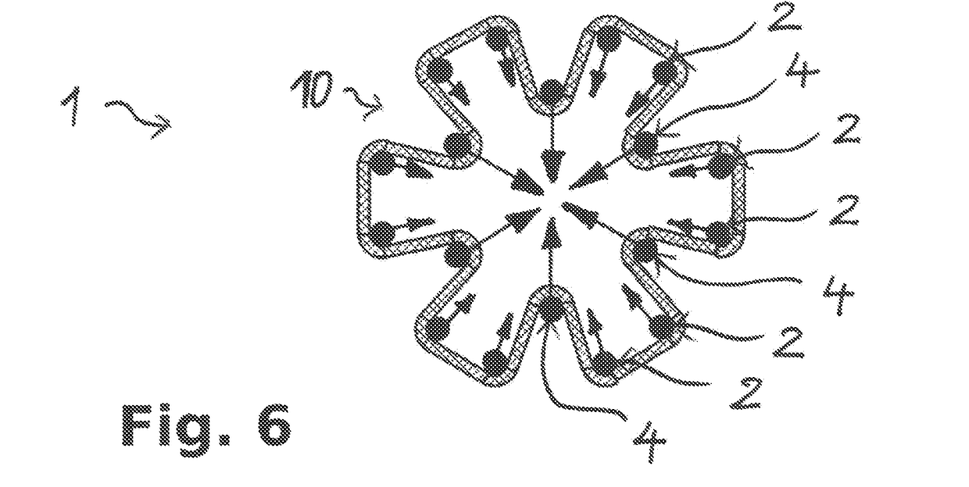
FIG. 6 schematically, the arrangement of FIG. 5, but wherein the displacement of the hub-side and rim-side deflection elements has proceeded further still.

FIG. 6 shows schematically the rim-side and hub-side deflection devices 2, 4 of FIG. 5 and the fibre coil 3 of FIG. 5, wherein the shaping of the spoke star has proceeded even further.

Figure 7:
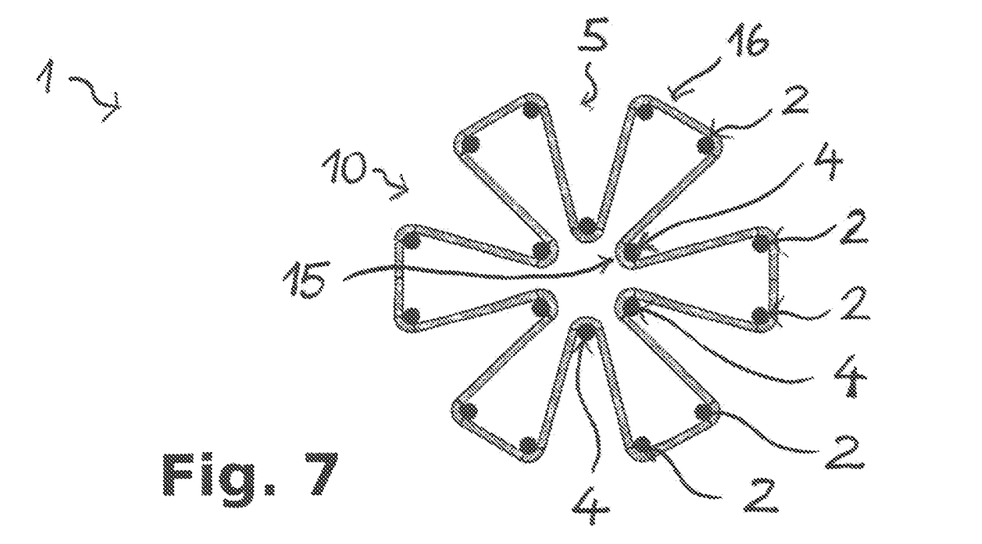
FIG. 7 schematically, the arrangement of FIG. 6, but wherein the displacement of the hub-side and rim-side deflection elements is finished, FIG. 8 schematically, the arrangement of FIG. 7, but wherein the spoke star is wound on the outer circumference with a rim coil.

FIG. 7 shows schematically the finished spoke star 5 of FIG. 6. FIGS. 1 to 7 show stages in a production process for a spoke star. The scale of FIGS. 1 to 6 is approximately the same, so that it becomes clear that the outer circumference 16 of the spoke star 5 decreases continuously with the deformation during the production from a fibre coil. The spoke star has an inner circumference 15 and an outer circumference 16. These are substantially dictated by the positions of the deflection devices 2 and 4.

Figure 8:
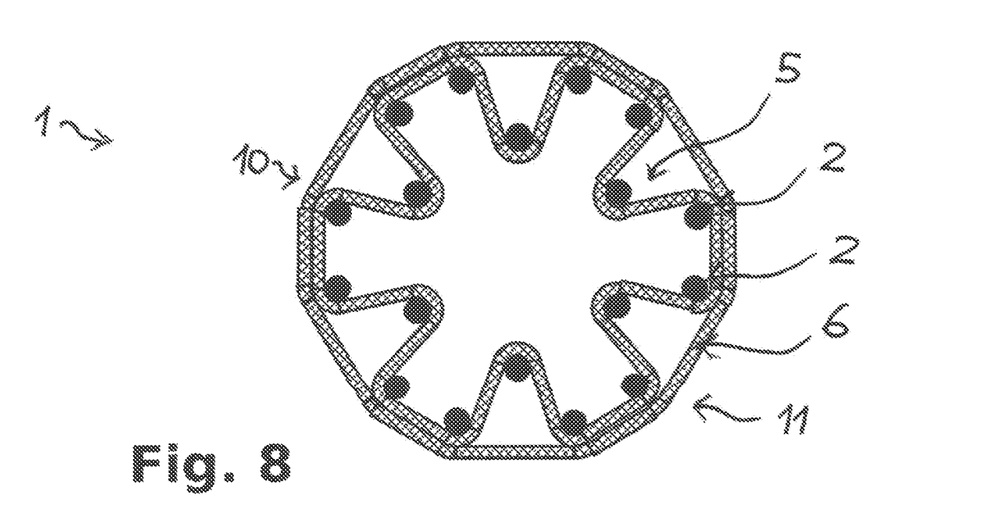

FIG. 8 shows the finished spoke star 5 of FIG. 7, but a rim coil 6 of continuous fibres has been wound around it. The rim-side and hub-side deflection devices 2, 4 are in the same position as in FIG. 7. Thanks to the winding of the spoke star 5 with a rim coil 6, the spoke star 5 can form the spokes of a rim 11 or another wheel-shaped device. The spacing of the rim-side deflection devices 2 arranged in pairs produces a region of the spoke star 5 lying parallel with the rim coil 6. The pairwise arrangement of the rim-side deflection devices 2 also means that the spokes of the spoke star 5 can be formed stronger in the radial direction. This is advantageous for the absorbing of radial forces.

Figure 9:
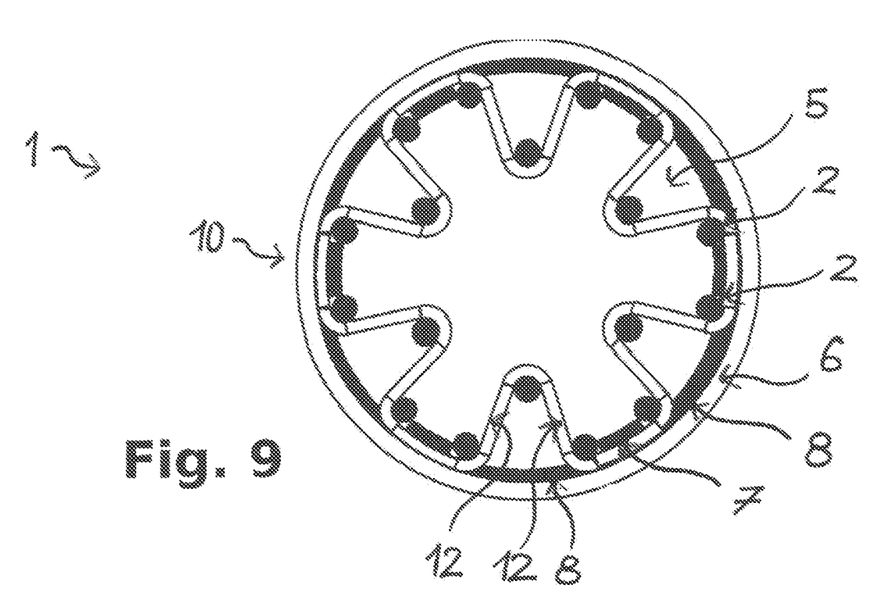
FIG. 9 schematically, the arrangement of FIG. 8, but wherein sections of the spoke star and the rim coil are curved convex on the outer circumference by shaping elements between the rim-side deflection elements.

FIG. 9 shows the rim 11 of FIG. 8 in the surface 1, but with the difference that spoke star shaping devices 7 and rim coil shaping devices 8 have been provided in order to achieve better roundness of the rim coil 6. The spoke star shaping devices 7 are arranged in the interior of the spoke star 5 between two rim-side deflection devices 2. They have a convex curvature on their outer circumference side, preferably having roughly the outer radius of the rim 11. In this way, the section of the spoke star 5 between the rim-side deflection devices 2 can be rounded in configuration. The rim coil shaping devices 8 are arranged between two spokes 12 of the spoke star 5, but outside the spoke star 5. The rim coil shaping devices 8 have a convex curvature on their outer circumference side, preferably corresponding roughly to the outer radius of the rim 11. The shaping devices 7, 8 are preferably positioned in the surface 1 relative to the deflection devices 2, 4. As shown, preferably a spoke star shaping device or a rim coil shaping device 8 is arranged each time between all adjacent rim-side deflection devices 2. The spoke star shaping devices 7 are preferably fastened in the surface 1 before producing the spoke star 5. The rim coil shaping devices 8 are preferably positioned in the surface 1 before the winding of the rim coil 6. The shaping devices significantly facilitate the production of a rim 11 for a vehicle.

Figure 10:
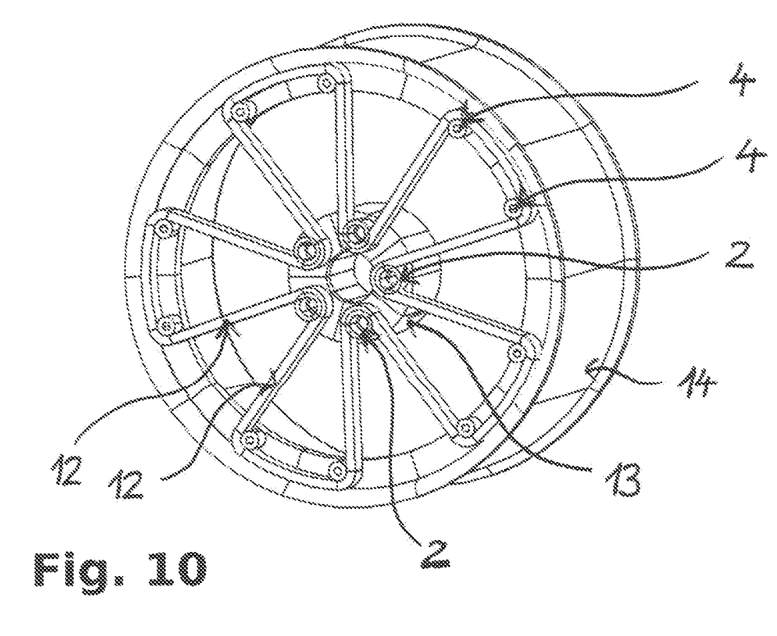
FIG. 10 a rim with a spoke star as represented in FIG. 7.

FIG. 10 shows schematically a spoked wheel, which in this example is configured as a rim for a motor vehicle. The rim comprises a spoke star 5 having spokes 12, a hub 13 and a wheel rim 14. The hub-side deflection devices 4 are embedded in the hub 13. The spoke star 5 is fastened to the hub 13 by the hub-side deflection devices 4. The rim-side deflection devices 2 are embedded in the wheel rim 14. The spoke star 5 is fastened by the rim-side deflection devices to the wheel rim 14. The spoke star 5 may be connected additionally or alternatively by integral bonding to the hub 13 and/or the wheel rim 14. The wheel rim may be formed from a rim coil 6 or comprise a rim coil 6. The hub-side deflection devices 4 may be configured as tube sections. In this case, the rim 11 may be connected by the hub-side deflection devices 4 to the vehicle.

Figure 11:
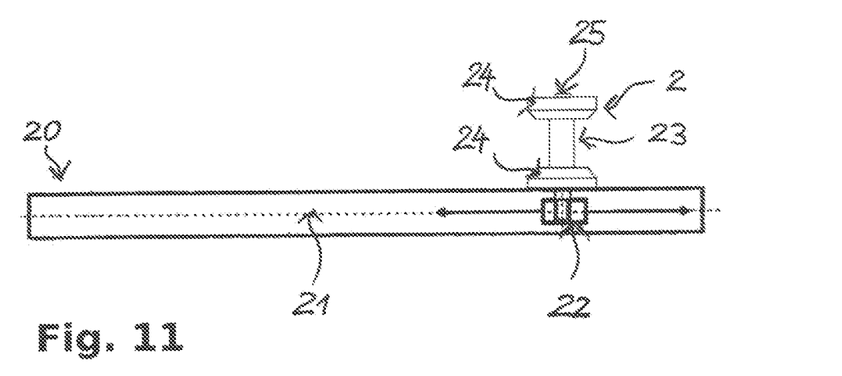
FIG. 11 a displacement device for a deflection device.

FIG. 11 shows schematically a displacement device 20 having a displacement axis 21 shown symbolically by broken lines. Along the displacement axis 21 a mover 22 can be displaced. A rim-side deflection device 2 is fastened to the mover 22. The rim-side deflection device 2 has the shape of a roller with a removed central section 23 and side pieces 24. Fibres not shown in FIG. 11 are preferably deflected by the central section 23. Preferably the side pieces 24 can be removed from the central section 23. The central section 23 may be configured as a sleeve, which remains in the spoke star 5. The side pieces 24 and the central section 23 may be placed onto an axle 25, which is fastened to the mover 22. Similarly, a hub-side deflection device 4 may also be fastened to the mover 22. A hub-side deflection device 4 may have the form of a roller, as described above in regard to the rim-side deflection device 2.

Figure 12:
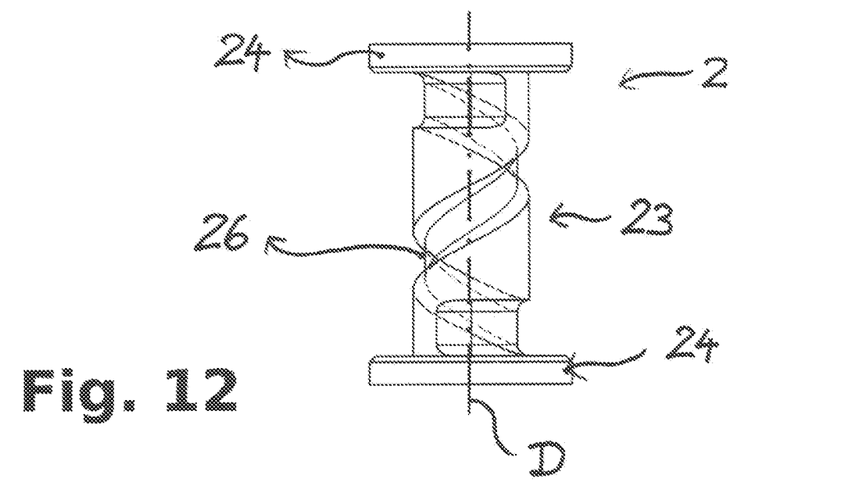
FIG. 12 a deflection device with helical recess.

FIG. 12 shows a rim-side deflection device 2, having substantially the form of a roller with a central section 23 and side pieces 24. In the central section 23 a helical recess 26 is introduced. In this recess 26, a fibre bundle can be placed for the deflection. By turning the deflection device 2 about an axis of rotation D, which coincides with the longitudinal axis of the deflection device 2, it is possible to vary the position of a deflected fibre bundle, not shown in FIG. 12, in the longitudinal direction. Preferably, the recess 26 is so broad in the longitudinal direction that a fibre bundle can run in the helical recess 26 in a plane transversely to the longitudinal direction. The fibre entrance to and the fibre exit from the deflection device 2 may then occur at the same position in the longitudinal direction of the deflection device 2. Alternatively or additionally, a hub-side deflection device 4 can be configured and used in the same way.

The invention claimed is:

1. A production method for a spoke star (5) with one or more continuous fibre bundles (111),
wherein a production device (100) comprising a rim side and a hub side is used for winding a fibre coil (3) and for deforming the fibre coil (3) into a spoke star (5),
wherein the production device (100) comprises a plurality of deflection devices (2) at the rim side and a plurality of deflection devices (4) at the hub side,
wherein the deflection devices (2) at the rim side and the deflection devices (4) at the hub side are arranged around an interior of an arrangement (10) of the deflection devices (2, 4),
wherein in a first step a continuous fibre bundle (111) is wound around at least a portion of the rim-side deflection devices (2) as a fibre coil (3), and in a second step, after this winding, at least a portion of the hub-side deflection devices (4) are shifted in the direction of the interior of the arrangement (10), the fibre coil (3) being deformed into a star, so that between the hub-side deflection devices (4) and the rim-side deflection devices (2) spokes (12) are formed from portions of the fibre coil (3), which form at least a portion of a closed spoke star (5).

2. The method according to claim 1, wherein at least one portion of the rim-side deflection devices (2) is displaced in its radial position in relation to the interior of the arrangement (10) to a start position for the deformation process of the fibre coil (3), in order to adjust the size of the spoke star (5) to be produced.

3. The method according to claim 1, wherein the rim-side deflection devices are displaced at least approximately in a winding direction of the fibre coil or at least approximately in the circumferential direction about the interior of the arrangement (10).

4. The method according to claim 1, wherein a rim coil (6) of a continuous fibre bundle is wound around an outer circumference of the spoke star (5).

5. The method according to claim 1, wherein the deflection device (2, 4) is designed to be rotatable about an axis of rotation (D) and is provided with a helical recess (26) on its outer circumference, into which the fibre coil (3) is laid, the axis of rotation (D) running in an interior of the helical recess (26) and the deflection device (2, 4) being rotated in order to move the fibre coil (3) in the direction of the axis of rotation (D) on the outer circumference of the deflection device (2, 4).

6. The method according to claim 1, wherein a rim-side outer section of the spoke star (5) and/or the rim coil (6) is placed against a shaping device (7, 8).

7. A production device (100) for producing a spoke star (5) with continuous fibres, wherein the production device (100) comprises the following:
a plurality of rim-side deflection devices (2) and a plurality of hub-side deflection devices (4), each of which is set up to receive a fibre coil (3) and which at the start of a deformation of the fibre coil (3) are arranged around the interior of an arrangement (10) of the deflection devices (2), as well as
a plurality of displacement devices (20) for the hub-side deflection device (4), by which the hub-side deflection devices (4) are displaceable from a position at the start of the deformation in the direction of the interior of the arrangement (10) of the rim-side deflection devices (2).

8. The production device (100) according to claim 7, wherein at least one displacement device (20) is pivotable in a surface (1) in which the deflection devices (2, 4) are arranged.

9. The production device according to claim 7, wherein groups of rim-side and hub-side deflection devices (2, 4) follow in succession in a winding direction about the interior of the arrangement (10), wherein a group comprises at least one deflection device (2, 4).

10. The production device (100) according to claim 7, wherein the deflection device (2, 4) comprises a helical recess (26) and is designed rotatable about a theoretical axis of rotation (D), wherein a fibre coil (3) is wrapped around the axis of rotation (D) in a wound condition.

11. The method according to claim 6, wherein the rim-side outer section of the spoke star (5) and/or the rim coil (6) is placed against an inner side of the spoke star (5) and/or of the rim coil (6).

12. The production device (100) according to claim 8, wherein at least one displacement device (20) is pivotable about a point in the interior of the arrangement (10) about a winding centre (W).

13. The production device according to claim 10, wherein groups of rim-side and hub-side deflection devices (2, 4) follow in succession in the winding direction about the interior of the arrangement (10), wherein a group comprises two deflection devices (2, 4), and/or more than two deflection devices (2, 4).

* * * * *